United States Patent [19]

Aubrey et al.

[11] Patent Number: 4,743,218
[45] Date of Patent: May 10, 1988

[54] INTERENGAGED VANE COUPLING WITH CIRCUMFERENTIALLY ARRANGED RESILIENT PADS

[75] Inventors: Joseph H. Aubrey, Barrow-in-Furness; Jeremy J. H. Smith, Windermere; John D. P. Banahan, Barrow-in-Furness, all of United Kingdom

[73] Assignee: Vickers Shipbuilding & Engineering Limited, Cumbria, United Kingdom

[21] Appl. No.: 910,913

[22] Filed: Sep. 24, 1986

[30] Foreign Application Priority Data

Oct. 4, 1985 [GB] United Kingdom ................ 8524498
Aug. 13, 1986 [GB] United Kingdom ................ 8619754

[51] Int. Cl.⁴ .............................................. F16D 3/64
[52] U.S. Cl. .......................................... 464/76; 464/85
[58] Field of Search ................... 464/74, 76, 83, 85, 464/94, 96

[56] References Cited

U.S. PATENT DOCUMENTS

| | | | |
|---|---|---|---|
| 2,122,838 | 7/1938 | Guy | 464/76 |
| 3,195,324 | 7/1965 | Sellwood et al. | 464/74 |
| 3,246,484 | 4/1966 | Haddad et al. | 464/76 X |
| 3,505,832 | 4/1970 | Braithwaite | 464/76 |
| 3,575,014 | 4/1971 | Wright | 464/74 |
| 3,779,040 | 12/1973 | Garrett | 464/76 X |

*Primary Examiner*—Daniel P. Stodola
*Attorney, Agent, or Firm*—Pollock, VandeSande & Priddy

[57] ABSTRACT

A flexible coupling comprises first and second annular members each carrying circumferentially spaced load transmitting members which are interengageable to form an annular interlocking array. Each load transmitting member has a resilient pad bonded to it and located between it and the load transmitting member adjacent thereto in the array. Each pad is bonded to an end piece for driving engagement with the adjacent load transmitting member and comprises a generally parallel sided laminar assembly of resilient and less resilient elements.

5 Claims, 3 Drawing Sheets

INTERENGAGED VANE COUPLING WITH CIRCUMFERENTIALLY ARRANGED RESILIENT PADS

This invention relates to flexible couplings which may be used to transmit a rotational drive between adjacent members of a power train.

Flexible couplings are used where there is likely to be misalignment between the adjacent members of the power train and/or one, or both, of the adjacent members is flexibly mounted. Certain designs of flexible coupling can attenuate irregularities in the torque being transmitted, e.g. from the power strokes of internal combustion engines, and so produce a smoother output.

It is known to use rubber or elastomeric elements as the resilient component of a flexible coupling. The purpose of the resilient component is to transmit a torque from an input member to an output member while acting as a "cushion" to accommodate relative movement between these two members. Like all elastomeric materials, rubber is quite strong in compression, only moderately strong in shear, but very weak in tension. Thus most flexible couplings employ the resilient elements in compression and shear, rather than tension.

Under high compression and shear loads, rubber can distort excessively. Also where large errors in alignment have to be accommodated, thick resilient elements are required. Thus for high loads and large misalignment, thick elements under considerable stress are required. Unfortunately, the thicker the rubber element, the greater the distortion, particularly if an element of shear is present in the loading. It is thus extremely difficult to produce a flexible coupling able to accommodate large misalignments with resilient elements which do not distort excessively under high loads.

Such couplings as are available, are either extremely expensive, or necessarily limited in either power transmission or misalignment capability. There is thus a need for an inexpensive flexible coupling, able to accommodate large misalignments and transmit high power.

According to the present invention there is provided a flexible coupling device for transmitting torque between first and second rotational members, said device comprising;

a first annular member which is securable to said first rotational member for rotation therewith about a first common axis;

a second annular member which is securable to said second rotational member for rotation therewith about a second common axis, said first and second axes being co-axial or generally co-axial;

first and second sets of load-transmitting members removably mounted on said first annular member and said second annular member respectively, the load-transmitting members of each set being circumferentially spaced from each other and each member of one set being interengageable drivingly with a respective member of the other set; and a plurality of circumferentially spaced resilient pads arranged one between each member of one set and the respective drivingly interengaged member of the other set;

in which:

the load transmitting members of each set together form a generally annular interlocking array;

each load transmitting member of each set has first and second load transmitting end surfaces lying substantially in planes passing through the axis of rotation of the respective annular member;

each resilient pad has one end tightly bonded to the first end surface of a respective load transmitting member of one set and has its other end tightly bonded to an end piece for driving engagement with the second end surface of an adjacent load transmitting member of the other set; and each pad comprises a substantially parallel-sided flexible member which is formed of a plurality of resilient elements which are separated by, and tightly bonded to, a plurality of less resilient elements to form a generally parallel laminar assembly.

Preferably, the resilient elements of each flexible member are made of an elastomeric material, such as rubber, and the less resilient elements are made of a metal such as steel. However, the less resilient elements may be made of suitable non-metallic material.

The flexible member of each pad is readily able to compensate for any misalignment which may occur in service between the first and second rotational members, as torque is transmitted therebetween via the flexible coupling, and yet does not undergo any serious permanent distortion in view of the manner by which loads will be transmitted through the pad i.e. load forces acting generally perpendicular to the general plane of the laminated assembly of the flexible member.

To facilitate the formation of each pad, it is preferred that each pad is moulded by positioning in a mould one of the load-transmitting members, a set of the less resilient elements and the end piece, and then casting any suitable elastomeric material into the mould, which thereby forms an integral laminated unit in the form of a load-transmitting assembly comprising the load-transmitting member, the pad and the end piece.

In the laminated unit, the load-transmitting assembly preferably is formed by an asymmetrical load-transmitting member which is adapted for rigid, yet removable, fixing to one of the annular members, and which has an exposed or outer radial end surface which is adapted for load bearing (to be engaged by the end piece of an adjacent pad). The end piece in the assembly is also preferably of asymmetrical form, and has an exposed or outer radial end surface which is adapted for load bearing.

In service, the load-transmitting member of each laminated assembly is fully restrained in all directions, whereas at the other end of the assembly i.e. the asymmetric end piece, there will be no restraint on movement in either the radial, axial or circumferential directions, other than that due to frictional forces due to the torque being transmitted between the abutting surfaces of the asymmetric end piece and the adjacent load-transmitting member of another assembly. Misalignment between the first and second rotational members, and therefore also between the first and second annular members of the flexible coupling, can be accommodated solely by compressive and/or shear movement across the substantially parallel-sided flexible member of each pad.

In order to promote slippage between the outer end surface of an asymmetric load-transmitting member of one assembly and the outer end surface of an asymmetric end piece of another assembly, it is preferred that a lubricant is applied to at least one of these faces where they abut. In this case, misalignment between the first and second rotational members may be accommodated by a combination of compressive deformation and/or shear movement within the flexible member of each pad, as well as by slippage of the outer faces of the asymmetric end pieces across the abutting outer faces of the load-transmitting members.

In order to accommodate the shear load transmitted between the first and second annular members of the coupling (forming the input and output members thereof), and the asymmetric load-transmitting members which are rigidly attached to them, it is preferred to use closely toleranced dowel pins which are a push fit in holes formed in the input (and output) member and the asymmetric load-transmitting members. Conventional fixing means e.g. bolts may be used in addition to, or instead of, dowel pins to fix the asymmetric load-transmitting members to the input or output members.

Preferred embodiments of a flexible coupling according to the invention will now be described in detail, by way of example only, with reference to the accompanying drawings, in which.

Figure 1:
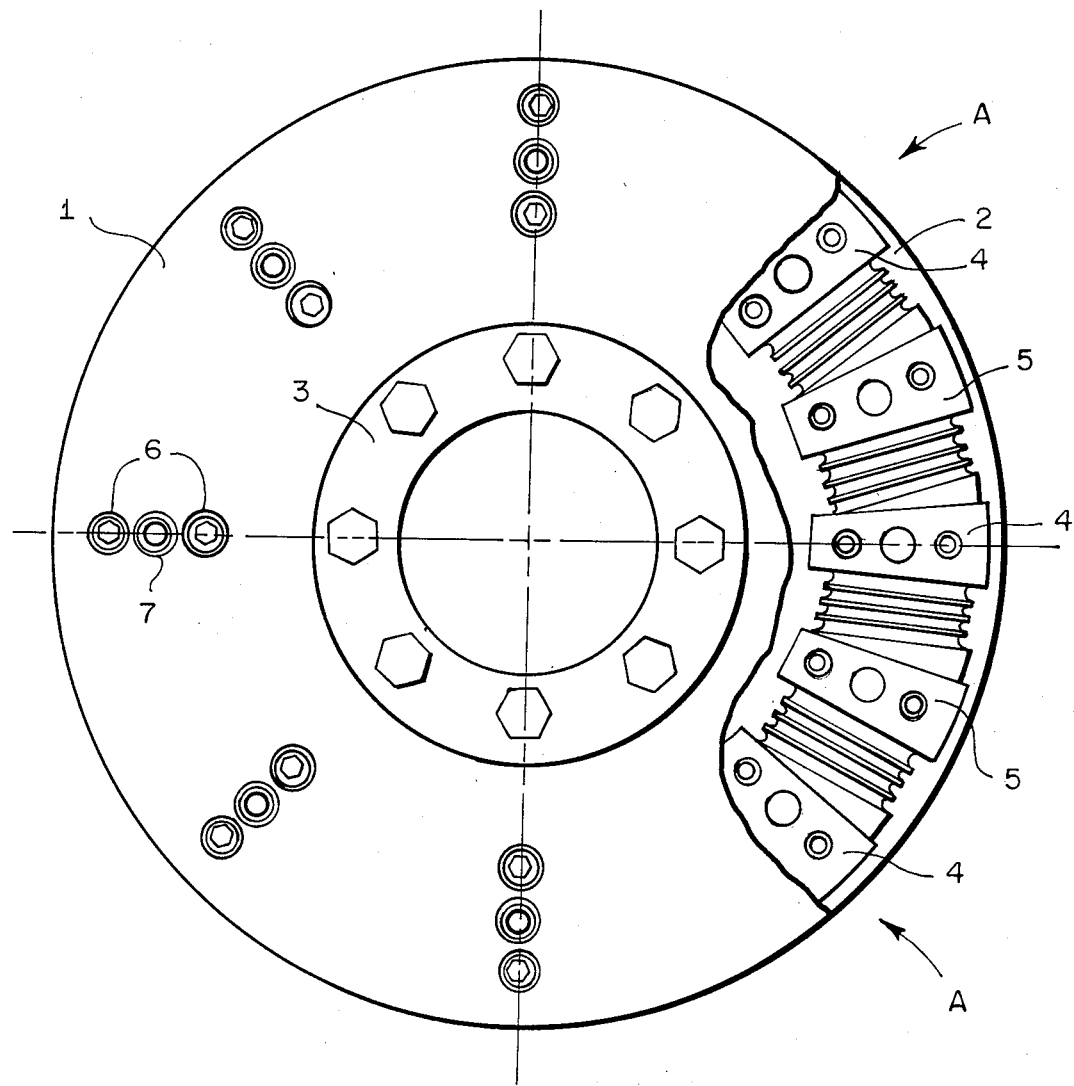
FIG. 1 is an end elevation of a flexible coupling according to the invention, with a partial cut-away to show the arrangement of the load-transmitting assemblies of the coupling.

Referring to the drawings, there is shown a flexible coupling device for transmitting torque between first and second rotational members, in which the device comprises a first annular member which is securable to the first rotational member for rotation therewith about a first common axis, and a second annular member which is securable to a second rotation member for rotation therewith about a second common axis, in which the first and second axes are coaxial or generally coaxial. First and second sets of load-transmitting members are attached to the first annular member and to the second annular member respectively, the load-transmitting members of each set being circumferentially spaced from each other and each member of one set being interengageable drivingly with a respective member of the other set. A plurality of circumferentially spaced parallel sided resilient pads is arranged one between each member of one set and the respective drivingly interengaged member of the other set.

In the flexible coupling device shown in FIG. 1, two end plates 1 and 2, which are essentially co-axial and parallel to each other, form the first and second annular members which are securable to the first and second rotational members (denoted by reference numerals 101 and 102 in FIGS. 2 and 3) respectively for rotation therewith. On the outer surfaces of each end plate 1, 2 i.e. the surface of each end plate not facing the other end plate, there is provision for the attachment of the first and second rotational members (either of which may be the input member with the other being the output member), for example, via flange ring 3.

Between arrows AA, a section of end plate 1 is cut-away to reveal five load-transmitting assemblies. The load-transmitting assemblies are arranged in two sets with equal numbers in each set. A first set of load-transmitting assemblies, of which three are shown and wherein each includes a load-transmitting member 4, is secured rigidly to end plate 1 by pairs of fastening bolts 6 and dowel pins 7. The second set of load-transmitting assemblies, of which two are shown in cut-away AA and wherein each includes a load-transmitting member 5, is rigidly secured to end plate 2 by similar pairs of fastening bolts and dowel pins (not shown). Each assembly of one set is interposed between adjacent assemblies of the other set so that together the assemblies form an annular interlocking array of assemblies. As will be apparent from FIG. 1, each assembly has two load-transmitting end surfaces, perpendicular to a plane at right angles to the axis of the respective annular member, and each surface is a radially extending surface, or inclined at a small acute angle to a radius, with respect to the rotational axis of the respective annular member. Thus the end surfaces lie substantially in planes passing through the rotational axis of the respective annular member.

Figure 4A:
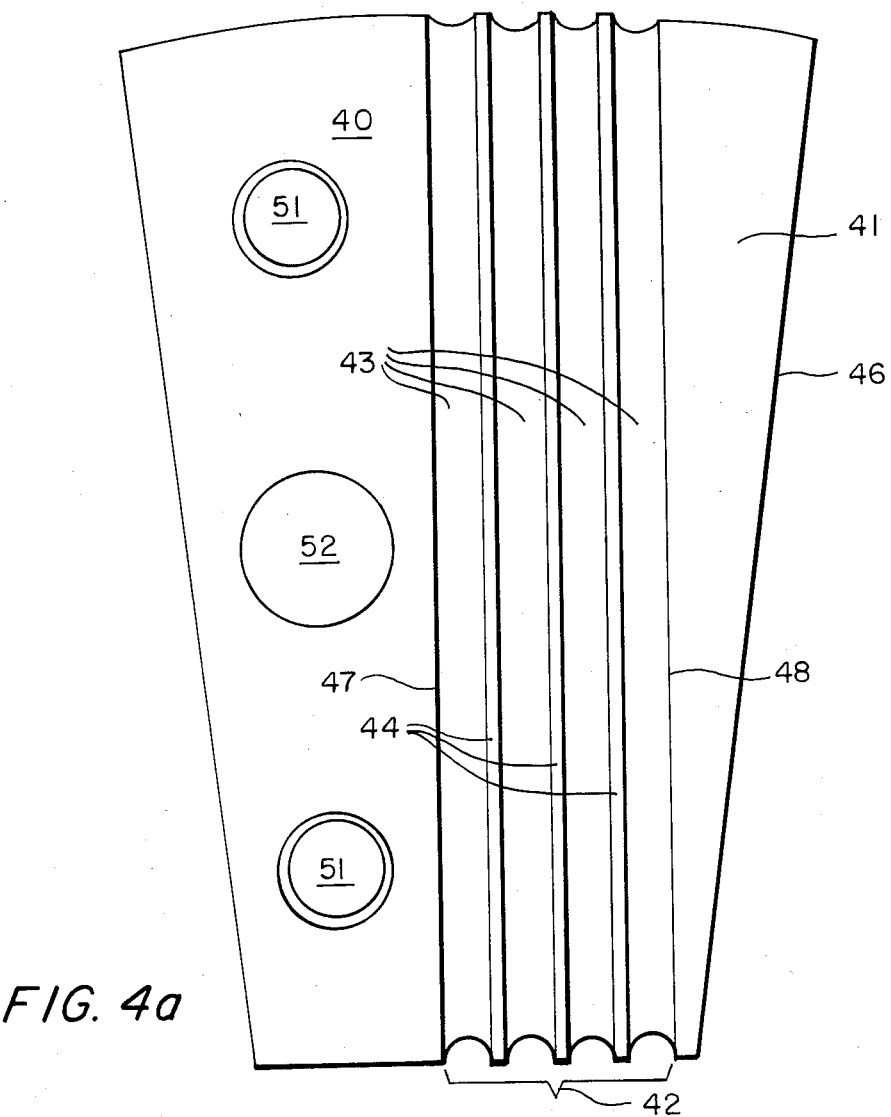
FIGS. 4a and 4b are side and end elevations, respectively of a load transmitting assembly comprising a load-transmitting member, pad and end piece of the coupling of FIGS. 1 and 2.
Figure 4B:
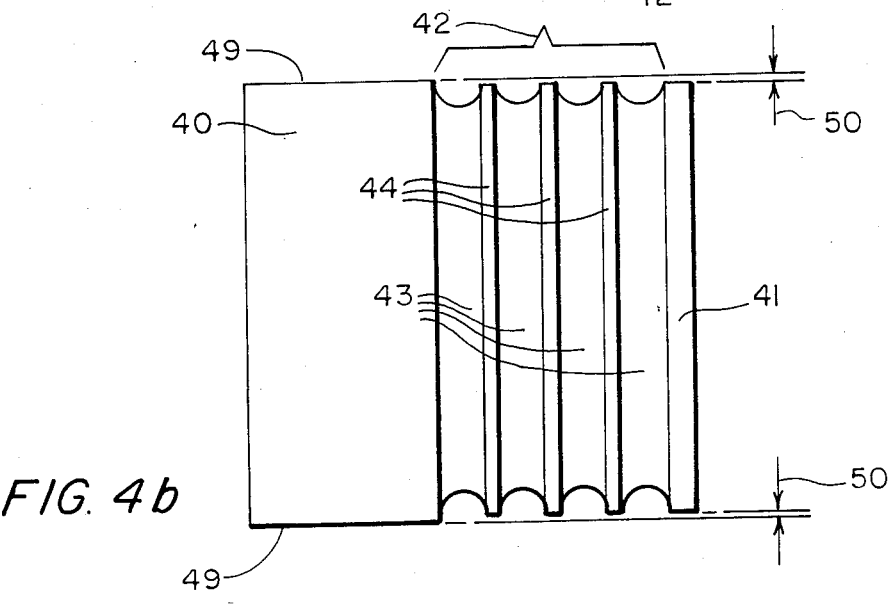

FIGS. 4a and 4b show the detailed design and construction of a load-transmitting assembly comprising a load transmitting member and a resilient pad and an end piece co-operating therewith. Preferably, the load-transmitting assemblies are substantially identical to maximise ease of manufacture and so that they are interchangeable with assemblies of their own set or of the other set so as to facilitate subsequent maintenance or replacement. Each assembly consists of the load transmitting member 4 in the form of a mild steel wedge-shaped vane, a mild steel wedge-shaped end piece 41 and a resiliently flexible pad 42. The resiliently flexible pad 42 consists of a plurality of resilient elements 43 (of which four are shown in FIGS. 4a and 4b) separated by, but tightly bonded to, a plurality of less resilient elements 44 (of which three are shown in FIGS. 4a and 4b). Thus the pad 42 is in the form of a generally parallel-sided laminar assembly wherein, in the absence of misalignment, the elements constituting the assembly are substantially parallel to a plane passing through the common axis of rotation of the annular members 1, 2.

The resilient elements 43 may be made of an elastomeric material such as rubber or other suitable polymer, or of any substance which resiliently distorts under load. The modulus of elasticity of the material of these resilient elements 43 could be typically in the range 0.7–70 MN/m$^2$. The less resilient elements 44 may be made of a material, such as steel, with a modulus of elasticity of typically 200–210 GN/m$^2$. Non-metallic materials may also have application as the less resilient material.

The use of a laminated construction for the flexible pads 42 is so that an adequate total thickness of the resilient material 43 may be present to provide for the misalignment requirements, yet not distort excessively under high compressive load. As the resilient material 43 is present in layers of only limited thickness, distortion due to direct compressive loading will be small and uniform across the whole pad area. However, because there is a substantial overall thickness of resilient material 43, a considerable degree of lateral distortion due to shear loading can be accommodated. The presence of the plurality of less resilient elements 44 maintains the overall substantially parallel form of the flexible pads 42. Even though shearing forces due to misalignment will distort the shape of pads 42, the change of section will be from that of a substantially parallel-sided rectangle to that of a substantially parallel-sided parallelogram.

Thus the combination of resilient elements 43 and less resilient elements 44 may be considered as analogous to the reinforcing of concrete by steel; the steel is strong in tension and bending and supplements the concrete which is strong only in normal compression. In this example, the metal plates 44 reinforce the stiffness of the rubber under compressive loading, yet do not detract from the overall flexibility of the shear. Without this laminar construction, any combination of high compressive and shear loading, caused by a combination of high power transmission and substantial misalignment, would produce an overturning moment which would otherwise lead to gross distortion of the pads 42 and premature failure.

Referring to FIGS. 4a and 4b, it will be seen that the overall shape of the integral load transmitting assembly is that of a symmetrical truncated sectoral prism. Both vane 4 and end piece 41 are wedge-shaped having an equal, but opposite, wedge angle so that the inner surfaces, 47 and 48 respectively, are parallel to each other. The units can be made by placing vane 4, a plurality of less resilient elements 44 and an end piece 41 in a moulding jig, which holds them in the correct positions. The mould is then filled with raw rubber and suitably polymerised. The result is that the rubber becomes tightly bonded to end surface 47 of vane 4 and end surface 48 of end piece 41 respectively as well as to the surfaces of the less resilient elements 44. Thus, after polymerisation, the assembly may be removed from the mould as a single, mechanically strong entity ready for use in a flexible coupling.

Substantially parallel sided pads 42 are used as they are easier to manufacture with repeatable properties. Clearly all the pads loaded in the forward sense of rotation must have the same properties in order to share the load carrying and misalignment duties equally. The pads loaded in the reverse sense of rotation must also have similar properties to each other. If there is to be interchangeability between the pads loaded in the forward and reverse senses of rotation, then all must have the same properties.

A further advantage of substantially parallel sided pads is that the driving torque is applied perpendicularly of the end faces of the pads. It would be possible to use wedge-shaped pads having a small included angle which would still give rise to a generally parallel laminar assembly. However in this case, the load due to the driving torque would have an element of shear which would be additive to the shear loading due to misalignment and so reduce the life of the pads.

Load transmitting end surface 45 of vane 4 and load-transmitting end surface 46 of end piece 41 are ground to a fine surface finish since they are required to act as load bearing surfaces. These surfaces lie substantially in planes passing through the axis of rotation of the respective annular member to which the assembly is fitted.

When sufficient units have been made, the coupling can be assembled. The method of assembly is as follows. End plates 1 and 2 are mounted in a suitable jig so that the plates are concentric, parallel to each other and the required distance apart. The jig permits free access to the circumference of the end plates and may also allow them to be rotated. A first load-transmitting assembly comprising a load transmitting member (vane 4), pad 42 and end piece 41 (FIG. 4) is then placed between the end plates and bolted to, say, end plate 1 by passing fastening bolts 6 (FIG. 1) through end plate 1 and screwing into tapped holes 51 in vane 4 (FIG. 4A).

When this is complete, but the bolts not fully tightened, a second load-transmitting assembly may be positioned adjacent to the first and secured in place to end plate 2 by fastening bolts (not shown in FIG. 1). A third load-transmitting assembly is placed adjacent to the second unit and is secured to end plate 1.

The process is repeated until the full complement of load-transmitting assemblies is in position, after which minor positional adjustments can be made and dowel pins 7 (FIG. 1) inserted. The purpose of the dowel pins is to act as the main load-carrying connection between the end plates 1 or 2 and vanes 4, via dowel pin holes 52. The dowel will be closely toleranced to be a push fit in end plate 1 or 2 and in dowel pin hole 52. It is inserted by a G-shaped compressing tool and removed by a puller, which engages with blind tapped hole 7A in a dowel pin 7 (FIG. 2).

Though bolts 6 have been instanced as the primary means of securing the vanes and dowel pins 7 have been instanced as the primary means of carrying the shear load, these roles could be combined into a single one by the use of specially designed bolts. Such bolts would have a closely toleranced shank of a substantial diameter, to perform the function of the dowel, with a smaller diameter threaded portion at the end to engage with a screw thread in the central part of the hole in vane 4.

Figure 2:
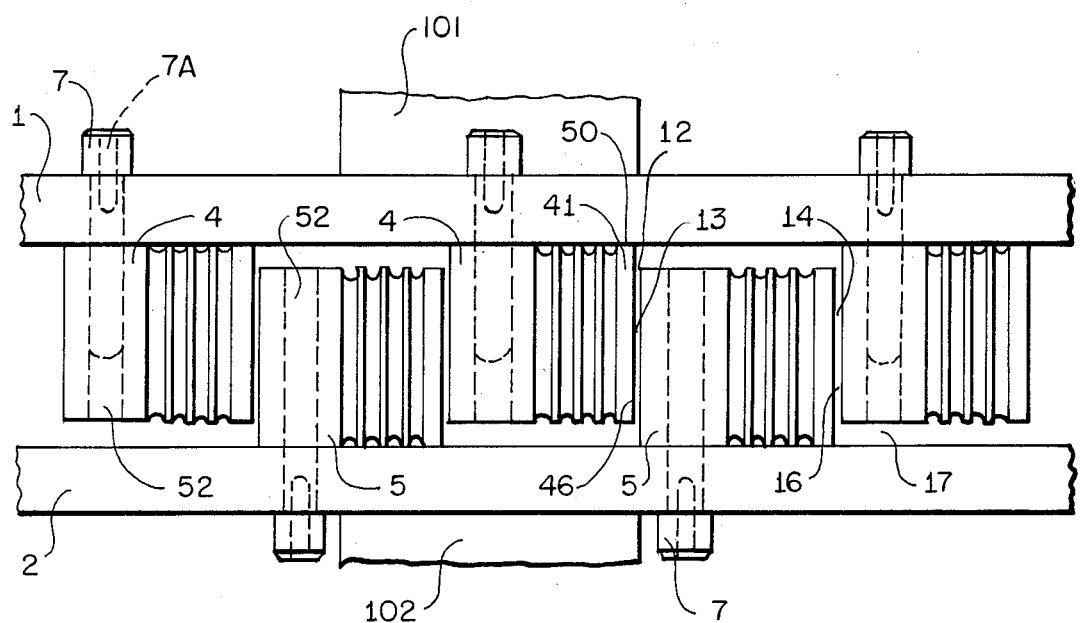
FIG. 2 is a developed circumferential elevation of the flexible coupling along the section A—A in FIG. 1.

FIG. 2 shows a developed circumferential elevation of the flexible coupling along section AA in FIG. 1 three load-transmitting members 4 are shown fast with end plate 1 and two further load-transmitting members 5 are shown fast with end plate 2. Dowel pins 7 are shown passing tightly through end plates 1 or 2 and into dowel holes in members 4 and 5. The fastening bolts (6) and tapped holes (51) in the members 4 and 5 (40) are not shown in FIG. 2 to avoid obscuring detail of the dowel pins 7 and holes 52.

It has already been stated that the load-transmitting assemblies are symmetrical. This applies to the elevations shown in both FIGS. 4a and 4b. Also dowel hole 52 and tapped holes 51 pass completely through vane 4. Thus the load-transmitting assemblies may be fitted to either end plate 1 or 2, i.e. they may be used in both left and right hand configurations. Reference to FIG. 4b shows that end piece 41 and less resilient elements 44 are (axially) narrower than vane 4, so that there is an axial clearance 50 at both sides. Thus when the coupling is assembled (FIG. 2), there will be an axial clearance 50 between the end pieces 41 and the end plate 1 (or 2) to which they are secured. Because the separation distance of the end plate 1, 2 is considerably greater than the length of the members 4 and 5, the clearance 30 between each member 4 (or 5) and the other end plate 2 (or 1) will be much greater than clearance 50.

Clearance 50 is the factor limiting the amount of misalignment which can be accommodated because, if the misalignment is too great, the end of end piece 41 will contact intermittently that end plate 1 or 2 to which it is attached. Where large amounts of misalignment are to be accommodated, clearance 50 must be increased. This could be done by casting the flexible elements 43 asymmetrically onto vane 4, i.e. as shown by vanes 4, 5 in the modification shown in FIG. 3. In this case, left and right handed assemblies would have to be cast; the left and right handed assemblies would not be interchangeable. Alternatively a spacer 18 may be inserted between the end plate and vane. Spacer 18 could be a machined projection on end plates 1 and 2. The end faces 49 (FIG. 4) of vanes 4 are ground, as are the mating surfaces of the end plates 1,2 so that the adjacent faces abut correctly. The mating surfaces of spacer 18 will be similarly ground.

To understand the operation of the coupling, assume that end plate 1 is the driving member of the coupling and that it is rotating from left to right in FIG. 2. The driving torque passes from end plate 1 via the dowel pins 7 and the fastening bolts (6 not shown) into vanes 4. As vanes 4 commence to rotate with end plate 1, the first load transmitting end surface of each vane 4 (surface 47 in FIG. 4a) will transmit the torque to the pad (42 in FIG. 4) bonded thereto and thence to the end piece 41. The end surface of each end piece 41 (surface 46 in FIG. 4a) will then contact the second load transmitting end surface 13 of adjacent vane 5, and so transmit the drive into vanes 5, and thence via dowel pins 7 and fastening bolts (6 not shown), to end plate 2, i.e. the driven member of the coupling. In FIG. 2, a circumferential clearance 12 is shown between end surface 46 of end piece 41 and end surface 13 of vane 5; this is necessary to permit assembly of the coupling, but the clearances 12 will be taken up as soon as the coupling starts to rotate.

When in the forward sense of rotation, the drive will be carried from end surface 46 of end piece 41 onto end surface 13 of vane 5. Usually, misalignment between end plates 1 and 2 will be accommodated by the shear flexibility of the pads 42. Under normal conditions, there should be no relative motion between surfaces 46 and 13. However, where excessive misalignment is likely to occur, a lubricant may be placed on surfaces 46 and/or 13 so that the misalignment can be accommodated by a combination of shear of the pads 42 and slippage between surfaces 46 and 13.

Figure 3:
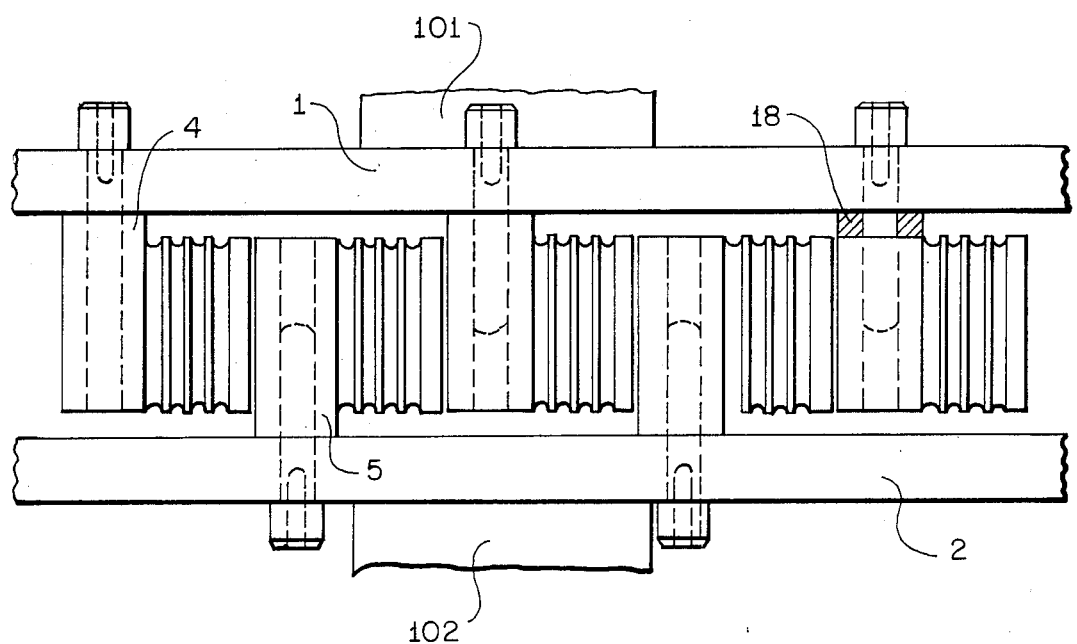
FIG. 3 is an alternative developed circumferential elevation along section A—A in FIG. 1.

When excessive misalignment has to be accommodated, the alternative design shown in FIG. 3, with large clearances at the sides of the pads is preferred, i.e. a clearance equivalent to spacer 18 rather than clearance 50.

When in the reverse sense of rotation, the drive will be from end plate 2, via dowels 7 to vanes 5 and thence to vanes 4 and end plate 1 via end surfaces 13, the flexible pads (42) and end pieces 41.

Irregularities in the torque being transmitted will be smoothed out by the resilience of the material, e.g. rubber, of elements 43. This property could be important if the motive power is supplied by an internal combustion engine with regular power strokes, as the effect of the coupling would be to smooth the torque from the output member. There are other instances where a coupling of the type disclosed could be advantageous. For example, if the speed of the prime mover is to be varied suddenly or if the reaction against which the prime mover is operating changes in a step-wise fashion, violent changes in the torque would result. Resilient elements in the flexible coupling would also attenuate the transmission of noise and vibration.

In a practical design of coupling, the torque to be transmitted would determine the properties of the rubber and thickness of elements 43. The amount and nature of the misalignment, i.e. magnitude and type (lateral, axial or angular), would determine the thickness of the pads 42, i.e. the numbers of each element 43 and 44. The magnitude of the torque to be transmitted determines the total pad area required, and hence the number of pads of a given area. This determines the overall diameter of the coupling. As with many designs, there has to be a compromise between two conflicting requirements. "Soft" couplings are preferred with many elements 43 and 44. But as the thickness of each pad increases, the radius of the coupling must also increase in order that the same number of pads may be used. However, increasing the magnitude of the radius at which the pads act increases the magnitude of any misalignment present in a proportionate relationship according to geometric laws. One possible solution to this problem could be concentric circles of pads.

Where excessive misalignment has to be accommodated, either by design or because of the large radius at which the pad has to act, thick, multi-layered pads would be used. The shearing effect on such pads may be lessened by permitting sliding movement between adjacent load-bearing faces 13 and 46, 14 and 16, etc.

We claim:

1. A flexible coupling device for transmitting torque between first and second rotational members, and to accommodate misalignment between said first and second members, said device comprising:

a first annular member which is securable to said first rotational member for rotation therewith about a first common axis;

a second annular member which is securable to said second rotational member for rotation therewith about a second common axis, said first and second axes being substantially coaxial; and first and second sets of load-transmitting members removably mounted on said first annular member and said second annular member respectively, the load-transmitting members of each set being circumferentially spaced from each other and each load-transmitting member of one set being interengaged with a respective load-transmitting member of the other set so as to transmit drive between the load-transmitting members;

a plurality of circumferentially spaced resilient pads arranged one between each load-transmitting member of one set and the respective interengaged load-transmitting member of the other set; and a plurality of circumferentially spaced end pieces arranged one between each pad of one set and the respective interengaged load-transmitting member of the other set; in which:

each resilient pad has one tightly bonded to a first end surface of a respective load-transmitting member of one set and has its other end tightly bonded to a surface of an end piece having another surface which abuts against, and is free to move axially and radially with respect to, a second end surface of an adjacent load-transmitting member of the other set when in driving engagement with said second end surface of the adjacent load-transmitting member, whereby there is provided a plurality of integral load-transmitting assemblies, each comprising one of said load-transmitting members, one of said pads, and one of said end pieces;

each pad comprises a substantially parallel-sided flexible member which is formed of a plurality of resilient elements which are separated by, and tightly bonded to, a plurality of less resilient elements to form a generally parallel laminar assembly; and wherein the load-transmitting assemblies of each set together form a generally annular interlocking array and, in each assembly, the second end surface of the load-transmitting member and said another surface of the end piece each lie substantially in planes passing through the axis of rotation of the respective annular member.

2. A device as claimed in claim 1 wherein the resilient elements of each flexible member are made of an elastomeric material and the less resilient elements of the flexible member are made of steel.

3. A device as claimed in claim 1 wherein a lubricant is provided between said another surface of the end piece of one assembly and said second end surface of the load transmitting member of the adjacent assembly.

4. A device as claimed in claim 1 wherein, in each assembly, said first end surface of the load transmitting member and said surface of the end piece to which the pad is bonded are substantially parallel and the load transmitting member is in the form of a vane.

5. A device as claimed in claim 1 wherein each load transmitting assembly is mounted on its respective annular member by means of a dowel passing through a hole in the load-transmitting member of the assembly and a hole in the respective annular member.

* * * * *